United States Patent [19]

Lawton

[11] 4,025,833
[45] May 24, 1977

[54] TORQUE DEMAND THERMAL SWITCH

[75] Inventor: Charles A. Lawton, Springfield, Ohio

[73] Assignee: Robbins & Myers, Inc., Springfield, Ohio

[22] Filed: May 7, 1975

[21] Appl. No.: 575,379

Related U.S. Application Data

[63] Continuation of Ser. No. 392,975, Aug. 30, 1973.

[52] U.S. Cl. .......................... 318/221 H; 318/223; 318/225 R
[51] Int. Cl.² .......................................... H02P 1/44
[58] Field of Search ....... 318/220 R, 221 R, 221 A, 318/221 H, 223, 225 R, 229

[56] References Cited

UNITED STATES PATENTS

| | | | |
|---|---|---|---|
| 2,203,927 | 6/1940 | Rutherford | 318/221 H |
| 2,266,088 | 12/1941 | Shea | 318/225 R |
| 2,417,912 | 4/1947 | Clark | 318/221 |

*Primary Examiner*—Gene Z. Rubinson
*Attorney, Agent, or Firm*—Melville, Strasser, Foster & Hoffman

[57] ABSTRACT

The application discloses a thermally actuated switch for electric motors which have some inherent starting torque, such as shaded pole and permanent split capacitor motors. The switch operates only upon abnormal torque demand, to cut out one of the windings of a motor having two windings, or to cut out part of a tapped single winding. The switch normally occupies a first position in which both windings, or the entire winding, are energized. It includes a bimetallic element and a heater coil in series with the windings. Under normal starting and running torque conditions the switch is in the first position, and insufficient heat is generated in the heater coil to trip the switch to its second position. In the event of an abnormal starting or running torque demand, the locked rotor current will persist and will exceed the running current, and heat will be generated in the heater coil. Thus, after delay, the switch will trip to the second position, in which one of the windings, or a part of a single winding, is cut out, whereby the torque is increased. Immediately upon switching to the increased torque position, losses in the heater cease. Shortly thereafter the device resets to the first position. Under normal conditions the device remains in this first position.

4 Claims, 1 Drawing Figure

TORQUE DEMAND THERMAL SWITCH

This is a continuation of copending application Ser. No. 392,975 filed Aug. 30, 1973 in the name of the same inventor and entitled TORQUE DEMAND THERMAL SWITCH.

BRIEF SUMMARY OF THE INVENTION

In many types of single phase electric motors, it is conventional to provide starting windings in addition to the running windings, and to provide automatic means to cut out the starting windings when the motor has come up to speed. The cutting out of the starting windings is accomplished by means of a switch, which may be centrifugally, thermally, or otherwise actuated.

There are some electric motors which have some nominal starting torque, and which under normal conditions require no special starting arrangements. Examples of such motors are the shaded pole motors and the permanent split capacitor type of motors, both of which are well known in the art and therefore do not require detailed description. When such motors encounter some unusual mechanical load, they have insufficient torque to start; or if running, they will stall.

The present invention contemplates means for increasing the torque capability of such a motor on demand, rather than designing into it an excessive nominal starting and running torque with associated higher costs, losses and currents. The motor is provided with a tapped winding, or two windings in series. It should be noted that when the phrase "tapped winding" is used hereinafter, it is intended to be inclusive of two windings in series.

A thermal switch is provided having two positions. In the normal position of the thermal switch, the entire winding is energized and the motor will start and run with normal load conditions. The switch comprises a bi-metallic element and an associated heater coil in series with the winding. When an abnormal load condition is encountered, such that the nominal designed torque of the motor is insufficient to start it, the locked rotor current persists and causes the heater coil to heat up, and thereby to cause the bi-metallic switch element to trip to a second position in which only the tapped portion of the winding is energized. Since the torque developed is directly related to the volts per turn of the excited winding, and since the applied voltage is now applied to fewer turns, the torque is increased. As soon as the device trips to the second position, losses in the heater cease. After a short thermal lag, during which the motor comes up to speed, the device resets to position one.

DETAILED DESCRIPTION

Figure 1:
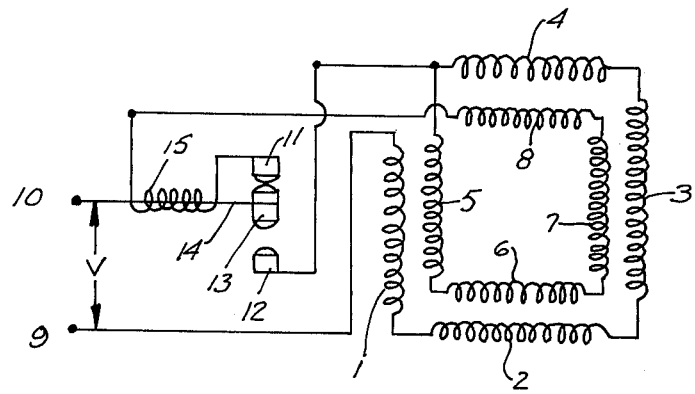
FIG. 1 is a diagram of a shaded pole motor showing the torque demand thermal switch.

A typical four pole shaded pole motor or other single phase motor having two coils per pole is diagrammatically illustrated in FIG. 1. The pole windings are indicated at 1 to 8 inclusive, and as shown, they are in series. Line voltage is applied across the points 9, 10. Fixed contacts are designated 11 and 12, and the movable contacts are shown at 13. The latter are mounted on a bi-metallic member 14 which is adjacent the heater coil 15 which is in series with the windings 1 to 8 inclusive, with the contacts 13 in their normal position as shown in the drawing. When voltage is applied at 9, 10, and the load on the motor is a normal one, the motor will start and come up to speed. The starting current surge is brief, and the running current is low enough that the heater coil does not cause the bi-metallic element to flex. Therefore the switch remains in the condition shown.

If there should be some added mechanical load on the motor shaft so that the motor fails to start, the locked rotor current would persist, and since it exceeds the running current it will cause the heater to heat up and trip the bi-metallic element to make contact between 12 and 13. This opens the windings 5 to 8 inclusive, so that the line voltage is applied only to windings 1 to 4 inclusive, thus increasing the torque and enabling the motor to start. As the motor is coming up to speed, no current exists in the heater coil. Cooling permits the switch to reset to the position shown in the drawing. It should be noted that this arrangement is not vulnerable to momentary power outages, and will cycle automatically when power is applied. The switch will go to its normal position shown in FIG. 1 whenever the power is off, either by intent or accidentally, or when the motor is running normally. The contact 13 will connect the contact 12 if power is applied and the motor not running, and will cycle between the two positions until the motor starts or the power supply is interrupted, as, for example, by a separate protector device, or otherwise.

Since the switch operates only on demand, contact life is vastly increased over conventional switch devices which operate at every motor start. This is particularly valuable in many motor applications where more than normal starting torque is required only rarely, as in small business machine motors.

It will be understood that while two windings have been shown in FIG. 1 the invention is equally applicable to a tapped single winding, and the principle of operation is the same. Thus, the phrase "tapped winding" in the claims is intended to cover two windings in series as well as a tapped single winding.

Figure 2:
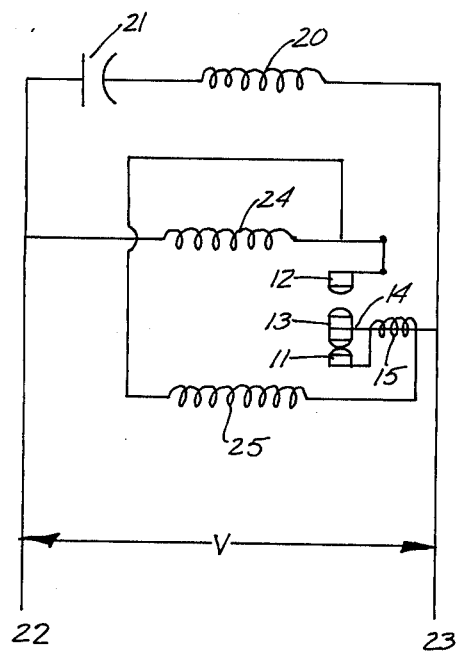
FIG. 2 is a diagram of a permanent split capacitor motor showing the torque demand thermal switch.

In FIG. 2 there is shown diagrammatically a permanent split capacitor motor. This motor has the usual starting winding 20 with a capacitor 21 aross the voltage supply line 22, 23. The main winding is tapped and includes the portions 24 and 25, each of which should be understood to encompass all the poles of the motor. The thermal switch elements are identified by the same reference numerals as in FIG. 1. It will be observed that with the switch in the position shown, with 13 and 11 in contact, both portions 24 and 25 of the main winding are in series across the line. If the motor is unable to start, the switch trips as above explained, opening contacts 13-11 and closing contacts 13-12. This opens the tapped portion 25 of the main winding and leaves only the portion 24 across the line. Thus the torque is increased, increasing the capability of the motor to start. Again, as the motor is coming up to speed, the loss of current through the heater permits it to cool, and after a short time causes the switch to snap back to the position shown in FIG. 2. The operation with a permanent split capacitor motor is thus exactly the same as with a shaded pole motor having two windings or a tapped single winding.

It will be understood that modifications may be made without departing from the spirit of the invention, and that therefore no limitation not expressly set forth in the claims is intended, and none should be implied.

The embodiments of the invention in which an exclusive property or privilege is claimed are defined as follows:

1. In an electric motor of the type responsive to a source of A.C. voltage and having a nominal starting torque and a tapped winding, a torque demand thermal switch comprising a bi-metallic element and a heater coil in proximity thereto, said bi-metallic element having a normal position for connecting said heater coil and said entire winding in series across said source, said bi-metallic element having a second position for connecting the tapped portion only of said winding across said source, said heater coil causing said bi-metallic element to trip from said normal position to said second position in response to heat generated in said heater coil when said motor is unable to properly start or to properly continue running due to an abnormal load, said bi-metallic element being caused to thereafter cycle between said second and normal positions until said overload has been overcome.

2. In a shaded pole electric motor responsive to a source of A.C. voltage and having two windings, a torque demand thermal switch comprising a bi-metallic element and a heater coil in proximity thereto, said bi-metallic element having a normal position for connecting said heater coil and both of said windings in series across said source, said bi-metallic element having a second position for connecting one of said windings only across said source, said heater coil causing said bi-metallic element to trip from said normal position to said second position in response to heat generated in said heater coil when said motor is unable to properly start or to properly continue running due to an abnormal load, said bi-metallic element being cause to thereafter cycle between said second and normal positions until said overload has been overcome.

3. In a shaded pole electric motor responsive to a source of A.C. voltage and having a tapped winding, a torque demand thermal switch comprising a bi-metallic element and a heater coil in proximity thereto, said bi-metallic element having a normal position for connecting said heater coil and said entire winding in series across said source, said bi-metallic element having a second position for connecting the tapped portion only of said winding across said source, said heater coil causing said bi-metallic element to trip from said normal position to said second position in response to heat generated in said heater coil when said motor is unable to properly start or to properly continue running due to an abnormal load, said bi-metallic element being caused to thereafter cycle between said second and normal positions until said overload has been overcome.

4. In a permanent split capacitor motor responsive to a source of A.C. voltage and having a tapped main winding, a torque demand thermal switch comprising a bi-metallic element and a heater coil in proximity thereto, said bi-metallic element having a normal position for connecting said heater coil and said entire winding in series across said source, said bi-metallic element having a second position for connecting the tapped portion only of said winding across said source, said heater coil causing said bi-metallic element to trip from said normal position to said second position in response to heat generated in said heater coil when said motor is unable to properly start or to properly continue running due to an abnormal load, said bi-metallic element being caused to thereafter cycle between said second and normal positions until said overload has been overcome.

* * * * *